(12) United States Patent
Sung et al.

(10) Patent No.: US 8,485,249 B2
(45) Date of Patent: Jul. 16, 2013

(54) CELO METHOD FOR VEHICLE

(75) Inventors: Nak Sup Sung, Hwaseong-si (KR);
Sang Ku Hur, Hwaseong-si (KR)

(73) Assignees: Hyundai Motor Company, Seoul (KR);
Kia Motors Corporation, Seoul (KR)

( * ) Notice: Subject to any disclaimer, the term of this patent is extended or adjusted under 35 U.S.C. 154(b) by 1369 days.

(21) Appl. No.: 11/967,564

(22) Filed: Dec. 31, 2007

(65) Prior Publication Data

US 2009/0101098 A1    Apr. 23, 2009

(30) Foreign Application Priority Data

Oct. 23, 2007 (KR) .................. 10-2007-0106673

(51) Int. Cl.
*B60H 1/00* (2006.01)
(52) U.S. Cl.
USPC .............................. 165/202; 165/271; 165/51
(58) Field of Classification Search
USPC ............... 165/202, 203, 204, 271, 51, 52, 41, 165/42, 43, 44
See application file for complete search history.

(56) References Cited

U.S. PATENT DOCUMENTS

| | | | | |
|---|---|---|---|---|
| 3,339,575 A | * | 9/1967 | Adelman et al. | 137/115.08 |
| 3,749,069 A | * | 7/1973 | Reese | 123/376 |
| 3,824,978 A | * | 7/1974 | Paquette | 123/185.14 |
| 3,853,109 A | * | 12/1974 | Dooley | 123/185.14 |
| 3,859,397 A | * | 1/1975 | Tryon | 261/39.2 |
| 4,033,232 A | * | 7/1977 | Benjamin et al. | 91/47 |
| 4,063,682 A | * | 12/1977 | Orcutt | 237/12.3 B |
| 4,206,645 A | * | 6/1980 | Orcutt | 236/19 |
| 4,269,351 A | * | 5/1981 | Orcutt | 236/87 |
| 4,291,717 A | * | 9/1981 | Orcutt | 137/86 |
| 4,345,554 A | * | 8/1982 | Hildreth et al. | 123/179.2 |
| 4,466,460 A | * | 8/1984 | Orcutt | 137/625.2 |
| 4,490,620 A | * | 12/1984 | Hansen | 290/38 R |
| 4,706,468 A | * | 11/1987 | Howland et al. | 62/199 |
| 4,711,095 A | * | 12/1987 | Howland et al. | 62/117 |
| 5,083,541 A | * | 1/1992 | Chen | 123/339.17 |
| 5,729,619 A | * | 3/1998 | Puma | 382/115 |
| 6,640,890 B1 | * | 11/2003 | Dage et al. | 236/49.3 |
| 6,868,900 B2 | * | 3/2005 | Dage et al. | 236/49.3 |

FOREIGN PATENT DOCUMENTS

| | | |
|---|---|---|
| KR | 10-2007-0053057 A | 5/2007 |
| KR | 10-2009-0020366 A | 2/2009 |

OTHER PUBLICATIONS

Definitions for "negligence", The Free Online Dictionary, Thesaurus, and Encyclopedia, Oct. 27, 2012, [online], [retrieved on Oct. 27, 2012]. Retrieved using the internet <URL:http://www.thefreedictionary.com/negligence>.*

* cited by examiner

*Primary Examiner* — Ljiljana Ciric
(74) *Attorney, Agent, or Firm* — Morgan, Lewis & Bockius LLP

(57) ABSTRACT

A cold engine lockout CELO method is carried out when cooling water of an engine is not sufficiently warmed upon the startup of a vehicle in the winter according to default levels, wherein the default levels are divided into a total default level, a partial default level and a control level according to inside and outside air temperatures.

5 Claims, 3 Drawing Sheets

CELO METHOD FOR VEHICLE

CROSS-REFERENCE TO RELATED APPLICATIONS

This application claims priority to Korean Application No. 10-2007-0106673, filed on Oct. 23, 2007, the disclosure of which is incorporated herein by reference.

BACKGROUND OF THE INVENTION

1. Field of the Invention

The present invention relates to a cold engine lockout (CELO) method for a vehicle, and more particularly, to a CELO method for a vehicle which uses an outside air temperature, an inside air temperature and a vehicle speed as inputs.

2. Description of the Related Art

The CELO is a technique that limits air flow from an air conditioning system or controls the direction of the air flow so that cold wind is not blown to a driver and/or a passenger (hereinafter collectively referred to as "passenger") when cooling water of an engine is not sufficiently warmed at the time of startup of a vehicle in the winter.

The CELO is carried out under a specific CELO condition in which an automatic air conditioning mode is set. Conventionally, as shown in FIG. 1, the temperature of cooling water fed into a heater core is measured using a Heating, Ventilation and Air Conditioning (HVAC) water temperature sensor in order to determine whether or not the CELO is likely to run.

For example, the CELO may be carried out under specific conditions, such as an outside air temperature of 15° C. or less and a cooling water temperature of 45° C. or less. Then, a blower operates in a low mode and a defrost mode is carried out in order to prevent cold wind from blowing toward the feet of a passenger. For an example of the CELO, Korean Patent Application No. 2005-0111016 (Nov. 24, 2005) can be referred to.

However, the above conventional CELO technique requires that a cooling water temperature sensor be added, which in turn increases the cost. Furthermore, the CELO cannot be carried out when the sensor is defective or broken.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made to solve the foregoing problems with the prior art, and therefore the present invention provides a CELO method for a vehicle, which can be correctly carried out according to vehicle conditions and passenger requirements without a cooling water temperature sensor.

According to an aspect of an exemplary embodiment of the present invention, the CELO method carries out a CELO in various modes according to default levels of a vehicle, wherein the negligence levels are divided into a total negligence level, a partial negligence level and a control level according to the inside and outside air temperatures, and wherein the CELO is carried out for the total or partial default levels but not for the control level.

In the CELO method, the CELO may be carried out for a longer time when the outside air temperature is lower than the inside air temperature, the CELO may be carried out for a longer time for the partial default level than for the total default level when the outside and inside air temperatures are the same, and the CELO may be carried out for a shorter time for a vehicle that is traveling faster than a reference speed than for a vehicle that is traveling slower than the reference speed. This is because the temperature of the cooling water is likely to rise when the vehicle is traveling at a specific speed higher than the reference speed.

In the CELO method, the default levels may be determined by comparing actually measured outside and inside air temperatures with reference data, which are previously divided into the total default level, the partial default level and the control level based on the correlation between the inside and outside air temperatures. The reference data may be plotted on a graph, which expresses the outside air temperatures on a horizontal axis and the inside air temperatures on a vertical axis, a partial default/control boundary and a partial/total default boundary are lines having positive slopes on a graph defined by the horizontal axis and the vertical axis, in which the slope of the partial/total default boundary is steeper than that of the partial default/control boundary, and the partial default/control boundary and the partial/total default boundary meet each other at a maximum temperature (e.g., an outside temperature of 15° C.).

According to the CELO method for a vehicle of an exemplary embodiment of the present invention, the CELO can be correctly carried out according to the vehicle conditions and passenger demands without a cooling water temperature sensor.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

Figure 1:
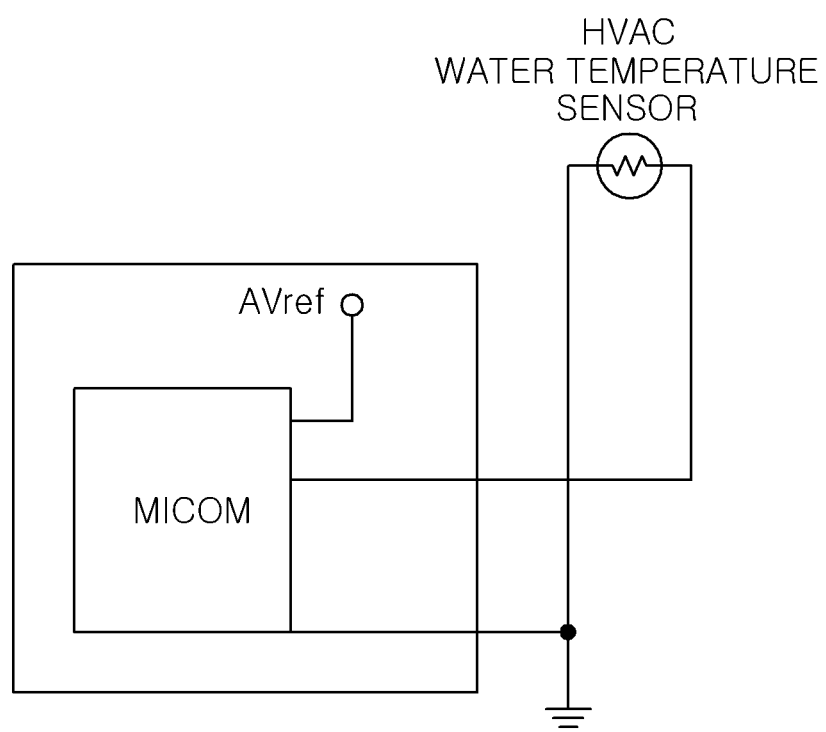
FIG. 1 is a schematic view illustrating a conventional CELO circuit.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

First of all, CELO operating conditions according to an exemplary embodiment of the present invention will be described in detail hereinafter.

An exemplary embodiment of the present invention provides a CELO method for a vehicle, which can be performed according to vehicle conditions and passenger requirements. The vehicle conditions are determined by default levels as described hereinafter.

The default levels of a vehicle conditions are basically determined according to the outside and inside air temperatures, and the CELO is carried out in various modes according to the determined default levels.

The default levels of a vehicle conditions indicate the levels at which the vehicle has been exposed to the outside environment, and include three levels, such as a total default level, a partial default level and a control level, determined by comparing a combination of actually-measured outside and inside air temperatures with reference data.

Figure 2:
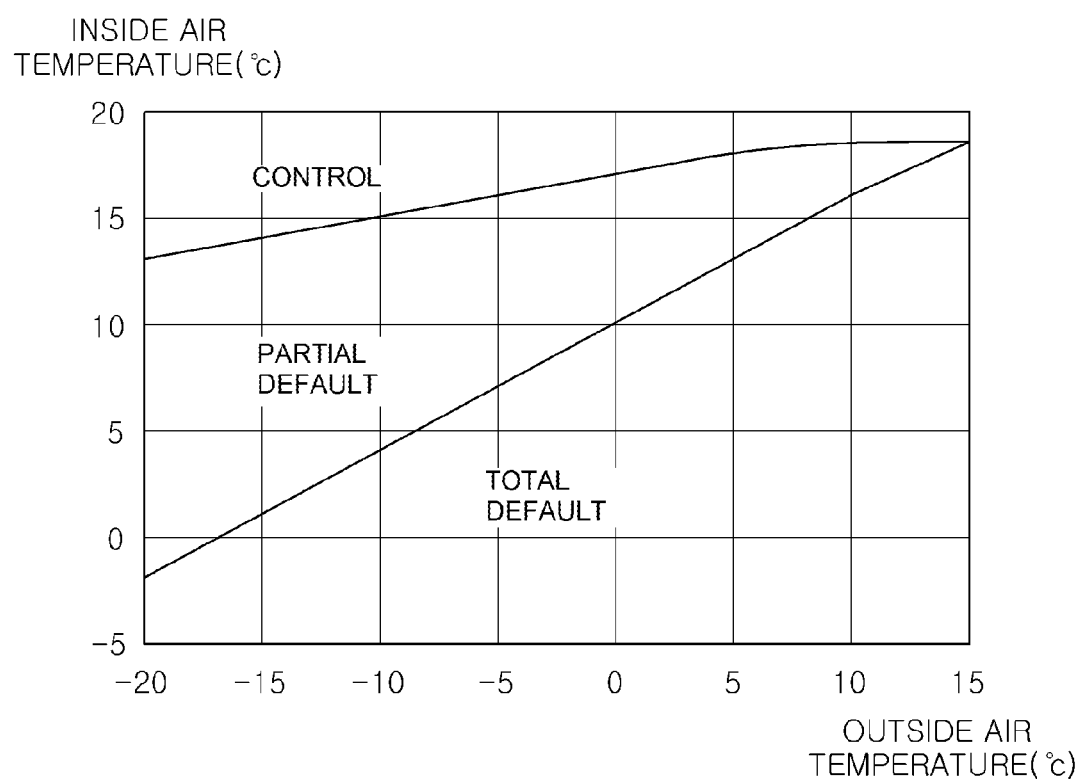
FIG. 2 is a graph explaining CELO operating conditions according to an exemplary embodiment of the present invention.

FIG. 2 shows the reference data on the correlation of the inside air temperature and the outside air temperature referring to the levels of default obtained through experiments according to an exemplary embodiment of the present invention.

The correlation of the inside air temperature and the outside air temperature with respect to the levels of default for the vehicle condition are expressed in a graph for the sake of easy understanding. In the graph of FIG. 2, the horizontal axis designates outside air temperatures while the vertical axis designates inside air temperatures.

The reference data used to determine the default levels of a vehicle condition can be obtained through a plurality of experiments and verifications based on the correlation between outside air temperatures and inside air temperatures. That is, the correlation between outside air temperatures and inside air temperatures can be determined on the basis of an outside air temperature, an inside air temperature and the difference between outside and inside air temperatures. One of the factors for determining the correlation between outside air temperatures and inside air temperatures may be the time it takes to warm coolant until the air is blown at a comfortable temperature for a passenger in various different combinations of outside and inside air temperatures.

Referring to FIG. 2 again, the control level is a state that the vehicle is cared not neglected in an ambient atmosphere and thus CELO control is not required. The partial default level is a state that a vehicle is partially neglected in an ambient atmosphere and thus CELO control is required. The total default level is a state that a vehicle is totally neglected in an ambient atmosphere and thus CELO control is required.

Further, a partial default/control boundary exists between the control level and the partial default level. The partial default/control boundary identifies whether or not a vehicle is partially neglected in an ambient atmosphere and has a line having a positive slope.

A partial default/total boundary exists between the partial default level and the total default level. The partial/total default boundary identifies whether or a vehicle is totally neglected in an ambient atmosphere and a line having a positive slope.

On the partial default/control boundary, representative outside/inside air temperatures may be −20° C./13° C., −15° C./14° C., −10° C./15° C., −5° C./16.5° C., 0° C./17° C., 5° C./18° C., 10° C./18.5° C. and 15° C./18.5° C.

The partial default/control boundary is a substantially straight line, in which the lowest point has conditions of an outside air temperature of about −20° C. and an inside air temperature of about 13° C., and the highest point has conditions of an outside air temperature of about 15° C. and an inside air temperature of about 18.5° C. However, the default/control boundary is substantially horizontal (i.e., slope=0°) in an outside air temperature range from about 10° C. to about 20° C.

Further, on the partial/total default boundary, representative outside/inside air temperatures may be −20° C./−2° C., −15° C./1° C., −10° C./4° C., −5° C./7° C., 0° C./10° C., 5° C./13° C., 10° C./16° C. and 15° C./18.5° C.

The partial/total default boundary is a substantially straight line, the lowest point of which corresponds to conditions of an outside air temperature of about −20° C. and an inside air temperature of about −2° C., and the highest point of which corresponds to conditions of an outside air temperature of about 15° C. and an inside air temperature of about 18.5° C.

Specially, the slope of the partial/total default boundary is steeper than that of the partial default/control boundary, and the two boundaries meet each other at a maximum CELO temperature, i.e., an outside air temperature of about 15° C. and an inside air temperature of about 18.5° C.

Examining the graph shown in FIG. 2 in greater detail, the inside air temperature at a specific outside air temperature becomes a factor determining the level of default of a vehicle.

For example, when the inside air temperature is about 0° C. or less, it is identified as partial or total default level but generally a total default level. The inside temperature of a vehicle may be 0° C. or less at night or in the early morning. In this case, since the vehicle may be totally neglected and cooling water is probably not warmed, the CELO is totally enabled.

In a partial default section, inside air temperatures are always higher than outside air temperatures.

In a total default section, the inside air temperatures are equal to or lower than, or higher than the outside air temperatures. For example, if the inside air is warmed by sunlight, the outside air temperatures are not likely to be higher than the inside air temperatures. This is because that the inside air temperature can be naturally raised by the sunlight while the outside air temperature remains the same. However, if the inside air temperature is not naturally raised by the sunlight, the inside air temperature may be equal to air temperature.

Thus, the degree of natural increase in the inside air temperature should be considered when the partial/total default boundary is set. Further, consideration should also be given to other factors, such as the sensitivity of passengers to air, which is introduced from a duct at a specific outside air temperature.

Since the slope of the partial/total default boundary is larger than that of the default/control boundary, the partial default level gradually narrows as the outside air temperature rises. This is identical with the fact that the necessity for the CELO gradually decreases as the outside air temperature rises.

Next, CELO method for controlling an operation of a blower will be described in detail.

As an exemplary embodiment of the present invention, referring to Table 1 below, the performance of the CELO in various fashions to operate a blower according to the various types of default level mentioned above will be set forth as an exemplary embodiment of the present invention.

The operation mode of a blower for the performance of the CELO comprises a defrosting mode, a mixed operation mode, and an auto mode.

The following table describes a relation between an outside air temperature and an operating time period of a blower according the operation mode.

TABLE 1

| Outside air temp (° C.) | Defrosting time (sec) | | Mixed operation time (sec) |
| --- | --- | --- | --- |
| | Partial default level | Total default level | |
| 15 | 30 | 60 | 30 |
| 10 | 40 | 75 | 30 |
| 5 | 50 | 90 | 30 |
| 0 | 60 | 120 | 30 |
| −5 | 80 | 150 | 40 |
| −10 | 100 | 180 | 50 |
| −15 | 120 | 200 | 60 |
| −20 | 140 | 200 | 60 |
| −40 | 140 | 200 | 60 |

As set forth in Table 1 above, in the CELO, defrosting and mixed modes are sequentially performed for preheating time periods (as will be described in detail later).

As shown in the above Table 1, the operation time period for a blower in the total default level is longer in the partial default level.

Of course, the colder the outside air is, the longer the CELO is enabled for. If the outside air temperature or the inside air temperature remains the same, the CELO needs a longer running time for a totally neglected vehicle than for a partially neglected vehicle.

The process of setting the CELO operation time as above is determined on the basis of the time it takes to warm coolant until the air is blown at a comfortable temperature for a passenger in various different combinations of outside and inside air temperatures.

In the process of setting the CELO operation time period, the speed of the vehicle should also be considered, in addition to the default level of the vehicle. That is, a reference speed is set in consideration of a preheating time that it takes to warm cooling water to a specific temperature.

When the vehicle is actually traveling faster than the reference speed, the (CELO operation time (i.e., the running time of the defrosting mode and/or the mixed mode) is set to be shorter than in the case of traveling slower than the reference speed.

For example, the CELO operation time periods reported in Table 1 above are applicable to vehicles traveling at a speed slower than the reference speed. For vehicles traveling faster than the reference speed, the CELO operation times can be set to be half of those of the slowly traveling vehicles. The reference speed is set to be in the range from 30 to 50 km/hr, and preferably, 40 km/hr in an exemplary embodiment of the present invention.

The operation of a CELO process will now be described with reference to FIG. 3 hereinafter.

Figure 3:
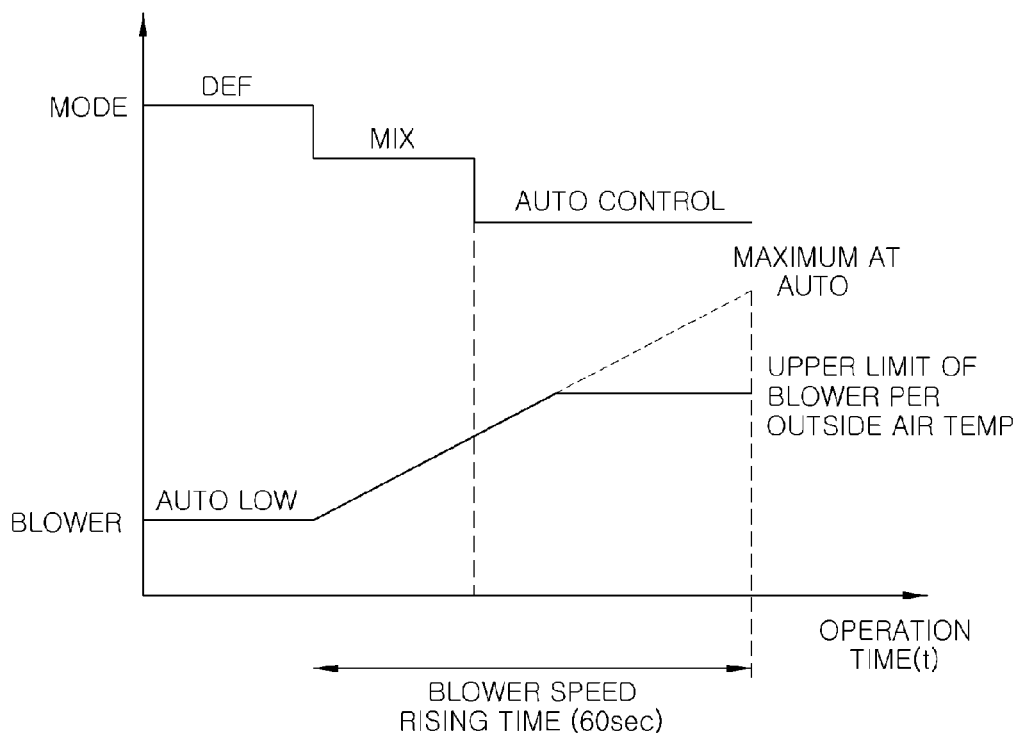
FIG. 3 is a graph illustrating a CELO method for controlling an operation of a blower according to an exemplary embodiment of the present invention.

As shown in FIG. 3, the CELO process starts up in a defrosting mode, followed by a mixed operation mode, and is then converted into an auto mode.

The defrosting mode is performed at the total or partial default level of the vehicle condition.

In the defrosting mode, the speed of a blower is maintained constant and in this mode, the amount of air introduced from a duct to the interior of a vehicle is controlled to be minimized because air is not sufficiently warmed yet.

However, cold wind may suddenly enter through the vent during conversion into the auto mode even when cooling water is not sufficiently warmed in the defrosting mode. In order to overcome this problem, the CELO process includes the mixed operation mode, which is a transient mode between the defrosting mode and the auto mode.

In the mixed operation mode, since the speed of the blower gradually rises, the passenger can slowly adapt himself/herself to the temperature of the air, which is introduced from the vent, and the blower speed is controlled to become gradually faster The preheated time periods in the defrosting mode and/or the preheated time period between the defrosting mode and the mixing mode can be determined on the base of the time it takes to warm coolant until the air is blown at a comfortable temperature for a passenger in various different combinations of outside and inside air temperatures and a current speed of the vehicle in consideration of a reference speed of the vehicle.

In the auto mode, the speed of a blower is maintained constant and in this mode, the amount of air introduced from a duct to the interior of a vehicle is controlled to be maximized to an upper limit level.

Typically, an outside air temperature sensor is implemented with a negative temperature coefficient thermistor (NTC), which is mounted in the front central portion of a radiator to detect the temperature of surrounding air. An inside air temperature is implemented with an NTC (or an NTC resistor), which is mounted to a side portion of a center instrument panel to the right of a driver to detect the temperature of air inside the vehicle, which is drawn in through a sensor suction hole. An exemplary embodiment of the present invention can adopt these temperature sensors as they are.

In brief, when the correlated values of the measured inside air temperature and the measured outside air temperature is positioned above the partial default/control boundary on the graph as shown in FIG. 2 as an exemplary embodiment of the present invention, the CELO is not carried out.

When the correlated values of the measured inside air temperature and the measured outside air temperature are positioned between the partial default/control boundary and the partial/total default boundary, the CELO is partially carried out.

When the correlated values of the measured inside air temperature and the measured outside air temperature are positioned under the partial/total default boundary, the CELO is totally carried out.

Generally, the operation time period for CELO in the total default level might be longer than in the partial default level. Furthermore, the CELO operation time can be adjusted according to the vehicle speed in addition to the default levels of a vehicle.

While the present invention has been described with reference to the particular illustrative embodiments and the accompanying drawings, it is not to be limited thereto, but will be defined by the appended claims. It is to be appreciated that those skilled in the art can substitute, change or modify the embodiments in various forms without departing from the scope and spirit of the present invention.

What is claimed is:

1. A cold engine lockout method of carrying out an operation mode of cold engine lockout (CELO) of a vehicle according to a vehicle condition, comprising:
 defining three levels of operation, a first level being a total default level, a second level being a partial default level and a third level being a control level according to an interior air temperature and an outside air temperature of the vehicle;

performing the cold engine lockout (CELO) in the total or partial default levels; and performing the cold engine lockout (CELO) for a first predetermined time period when the vehicle is traveling faster than a reference speed and performing the cold engine lockout (CELO) for a second predetermined time period longer than the first predetermined time period when the vehicle is traveling slower than the reference speed.

2. The cold engine lockout method according to claim 1, further comprising:

performing the cold engine lockout (CELO) for a longer time when the outside air temperature is lower than the interior air temperature than when the outside air temperature is higher than the interior air temperature; and performing the cold engine lockout (CELO) for a longer time for the partial default level than for the total default level when the outside air temperature and the interior air temperature are the same.

3. The cold engine lockout method according to claim 1, wherein the operation mode of the CELO comprises:

a defrosting mode at which a speed of a blower stays at a first predetermined speed;

a mixed operation mode, during which the speed of the blower is gradually increased for a predetermined time period with a predetermined slope; and an auto mode at which the speed of the blower stays constant but higher than the first predetermined speed;

a mixed operation mode, during which a speed of the blower is gradually increased for a preheated time period with a predetermined slope.

4. The cold engine lockout method according to claim 1, wherein the three levels of operation are determined by comparing the outside air temperature and the interior air temperature;

wherein the partial default level is a level in which a value of an inside air temperature therein at a predetermined outside temperature is determined to be higher than or equal to a value of an inside air temperature at the predetermined outside air temperature in the total default level; and wherein the control level is a level in which a value of an inside air temperature therein at the predetermined outside temperature is determined to be higher than or equal to the value of the inside air temperature in the partial default level.

5. The cold engine lockout method according to claim 1 or 4, wherein the reference speed ranges from 30 km/hr to 50 km/hr.

* * * * *